United States Patent
Bhandary (10) Patent No.: US 10,909,458 B2
(45) Date of Patent: Feb. 2, 2021

(54) METHOD AND SYSTEM FOR MACHINE FAILURE PREDICTION BASED ON A BASIC WEIGHT RANGE ASCERTAINED FOR EACH BASIC MEMORY DEPTH VALUE IDENTIFIED FROM A MACHINE FAILURE HISTORY

(71) Applicant: AVANSEUS HOLDINGS PTE. LTD., Singapore (SG)

(72) Inventor: Chiranjib Bhandary, Bangalore (IN)

(73) Assignee: Avanseus Holdings Pte. Ltd., Singapore (SG)

( * ) Notice: Subject to any disclaimer, the term of this patent is extended or adjusted under 35 U.S.C. 154(b) by 1092 days.

(21) Appl. No.: 15/371,671

(22) Filed: Dec. 7, 2016

(65) Prior Publication Data

US 2018/0121793 A1    May 3, 2018

(30) Foreign Application Priority Data

Nov. 3, 2016   (IN) .............................. 201611037626

(51) Int. Cl.
*G06N 3/08*     (2006.01)
*G06N 3/04*     (2006.01)

(52) U.S. Cl.
CPC .......... *G06N 3/084* (2013.01); *G06N 3/0445* (2013.01)

(58) Field of Classification Search
None
See application file for complete search history.

(56) References Cited

U.S. PATENT DOCUMENTS

| | | | | |
|---|---|---|---|---|
| 5,448,681 | A * | 9/1995 | Khan | G05B 13/027 706/23 |
| 6,708,160 | B1 * | 3/2004 | Werbos | G06N 3/02 706/30 |
| 9,336,482 | B1 * | 5/2016 | Corrado | G06N 3/0472 |

(Continued)

OTHER PUBLICATIONS

Werbos, P.J. (1990). "Backpropagation through time: What it does and how to do it". Proceedings of teh IEEE, vol. 78, No. 10, Oct. 1990, pp. 1550-1560. (Year: 1990).*

(Continued)

*Primary Examiner* — Kamran Afshar
*Assistant Examiner* — Benjamin J Buss
(74) *Attorney, Agent, or Firm* — Renner, Otto, Boisselle & Sklar, LLP (57) ABSTRACT

Embodiments of the invention provide a method and system for machine failure prediction. The method comprises: identifying a plurality of basic memory depth values based on a machine failure history; ascertaining a basic weight range for each of the plurality of basic memory depth values according to a pre-stored table including a plurality of mappings each mapping between a basic memory depth value and a basic weight range, or a predetermined formula for calculating the basic weight range based on the corresponding basic memory depth value; ascertaining a composite initial weight range by calculating an average weight range of the ascertained basic weight range for each identified basic memory depth value; generating initial weights based on the composite initial weight range; and predicting a future failure using a Back Propagation Through Time (BPTT) trained Recurrent Neural Network (RNN) based on the generated initial weights.

19 Claims, 11 Drawing Sheets

(56) References Cited

U.S. PATENT DOCUMENTS

| | | | |
|---|---|---|---|
| 2003/0065525 A1* | 4/2003 | Giacchetti | A61B 5/0059 705/1.1 |
| 2018/0046149 A1* | 2/2018 | Ahmed | F24F 11/30 |
| 2018/0046902 A1* | 2/2018 | Liao | G06N 3/0454 |

OTHER PUBLICATIONS

Prokhorov, D.V. (2004). "Backpropagation through time and derivative adaptive critics: A common framework for comparison." Handbook of learning and approximate dynamic programming 2 (2004). 24 pages. (Year: 2004).*

Novak, D. (2008.) "Long Short-Term Memory for Apnea Detection based on Heart Rate Variability". 30th Annual International IEEE EMBS Conference, Vancouver, British Columbia, Canada, Aug. 20-24, 2008, pp. 5234-5237. (Year: 2008).*

Wang, S-C. (2003). "Artificial neural network." Chapter 5 of Interdisciplinary computing in java programming. Springer, Boston, MA, 2003. 81-100. (Year: 2003).*

Riley, J. (1997). "An Evolutionary Approach to Training Feed-Forward and Recurrent Neural Networks". M.S. Thesis. Department of Computer Science, Royal Melbourne Institute of Technology, Australia. 75 pages. (Year: 1997).*

\* cited by examiner

| Monday | Tuesday | Wednesday | Thursday | Friday | Saturday | Sunday |
|--------|---------|-----------|----------|--------|----------|--------|
| 0 | 1 | 0 | 0 | 0 | 1 | 0 |

| Failure sequence | Inter-failure gap |
|------------------|-------------------|
| 2 | 5 |
| 3 | 3 |
| 4 | 10 |
| 5 | 5 |
| 6 | 3 |

| Parameter | Sample value |
|---|---|
| Failure occurrence indicator | 1 |
| PM counter – average call attempts per hour | 5000 |
| Temperature | 30°C |
| Wind speed | 100 m / sec |

Figure 1(e)

| Time period | 1 | 2 | 3 | 4 | 5 | 6 | 7 |
|---|---|---|---|---|---|---|---|
| Failure occurrence indicator | 1 | 0 | 0 | 0 | 0 | 0 | 1 |
| PM counter – average call attempts per hour (count) | 5000 | 5500 | 4800 | 5300 | 5200 | 5000 | 4900 |
| Temperature (°C) | 30 | 28 | 27 | 29 | 30 | 31 | 28 |
| Wind speed (m/sec) | 100 | 120 | 80 | 90 | 110 | 90 | 80 |

| Sl. No. | Basic Memory Depth value | Basic weight range |
|---|---|---|
| 1 | 10 | 3, [-1.5, +1.5] |
| 2 | 15 | 3, [-1.5, +1.5] |
| 3 | 20 | 3.1, [-1.55, +1.55] |
| 4 | 25 | 3.3, [-1.65, +1.65] |
| 5 | 30 | 3.3, [-1.65, +1.65] |
| 6 | 35 | 3.6, [-1.8, +1.8] |
| 7 | 40 | 3.6, [-1.8, +1.8] |
| 8 | 45 | 3.7, [-1.85, +1.85] |
| 9 | 50 | 3.8, [-1.9, +1.9] |
| 10 | 55 | 4.0, [-2.0, +2.0] |
| 11 | 60 | 4.1, [-2.05, +2.05] |
| 12 | 65 | 4.4, [-2.2, +2.2] |
| 13 | 70 | 4.6, [-2.3, +2.3] |
| 14 | 75 | 4.8, [-2.4, +2.4] |

| Failure Indicator | 1 | 0 | 0 | 0 | 0 | 1 | 0 | 0 | 0 | 0 | 0 | 0 | 0 | 0 | 0 | 1 | 0 | 0 |
|---|---|---|---|---|---|---|---|---|---|---|---|---|---|---|---|---|---|---|
| Count of time units since last failure | 0 | 1 | 2 | 3 | 4 | 0 | 1 | 2 | 3 | 4 | 5 | 6 | 7 | 8 | 9 | 10 | 0 | 0 |
| Cue (normalized using division by 100) | 0 | 0.01 | 0.02 | 0.03 | 0.04 | 0 | 0.01 | 0.02 | 0.03 | 0.04 | 0.05 | 0.06 | 0.07 | 0.08 | 0.09 | 0.1 | 0 | 0.01 |

Figure 7

| Test No. | Failure history sequence | Composite initial weight range | Error limit | Actual weight - low | Actual weight - high | Number of epochs |
|---|---|---|---|---|---|---|
| 1 | 40-20 | 3.35 | 0.02 | -2.0081 | 1.8586 | 6712 |
| 2 | 40-15 | 3.3 | 0.02 | -2.1122 | 1.9769 | 2743 |
| 3 | 40-20-10 | 3.23 | 0.02 | -2.4951 | 2.1908 | 4571 |
| 4 | 40-20-10-5 | 2.9 | 0.03 | -2.0715 | 1.7491 | 659 |
| 5 | 40-20-10-5-10 | 2.52 | 0.03 | -1.7803 | 1.6559 | 719 |
| 6 | 25-15-10 | 3.1 | 0.02 | -2.0263 | 1.9082 | 1228 |
| 7 | 50-25-10-15 | 3.275 | 0.02 | -2.2189 | 1.9656 | 1564 |
| 8 | 20-5-15-20 | 3.05 | 0.02 | -2.3284 | 2.5052 | 1289 |
| 9 | 20-5-15-20-5 | 2.84 | 0.01 | -1.8876 | 1.8331 | 6558 |
| 10 | 5-10-60-5-10 | 3.22 | 0.01 | -2.0698 | 1.9521 | 13204 |
| 11 | 10-5-70-10-5 | 3.12 | 0.004 | -1.9481 | 1.7902 | 26214 |

| Sl. No. | Basic Memory Depth value | Basic weight range | Error limit | Actual weight - low | Actual weight - high | Number of epochs |
|---|---|---|---|---|---|---|
| 1 | 10 | 3, [-1.5, +1.5] | 0.04 | -1.5566 | 1.5863 | 194 |
| 2 | 15 | 3, [-1.5, +1.5] | 0.03 | 1.6147 | 1.1628 | 233 |
| 3 | 20 | 3.1, [-1.55, +1.55] | 0.03 | -1.6469 | 1.6463 | 361 |
| 4 | 25 | 3.3, [-1.65, +1.65] | 0.03 | -1.7988 | 1.7966 | 367 |
| 5 | 30 | 3.3, [-1.65, +1.65] | 0.02 | -1.9987 | 1.8500 | 1424 |
| 6 | 35 | 3.6, [-1.8, +1.8] | 0.02 | -2.0050 | 1.9746 | 1299 |
| 7 | 40 | 3.6, [-1.8, +1.8] | 0.008 | -2.0271 | 1.9922 | 9304 |
| 8 | 45 | 3.7, [-1.85, +1.85] | 0.008 | -2.1987 | 2.0910 | 10567 |
| 9 | 50 | 3.8, [-1.9, +1.9] | 0.008 | -2.4080 | 2.1497 | 22255 |
| 10 | 55 | 4.0, [-2.0, +2.0] | 0.008 | -2.2674 | 2.0989 | 10247 |
| 11 | 60 | 4.1, [-2.05, +2.05] | 0.008 | -2.2648 | 2.2206 | 13213 |
| 12 | 65 | 4.4, [-2.2, +2.2] | 0.008 | -2.5686 | 2.4320 | 23666 |
| 13 | 70 | 4.6, [-2.3, +2.3] | 0.004 | -2.7015 | 2.7432 | 48756 |
| 14 | 75 | 4.8, [-2.4, +2.4] | 0.004 | -2.7239 | 2.7624 | 26913 |

Figure 9(d)

METHOD AND SYSTEM FOR MACHINE FAILURE PREDICTION BASED ON A BASIC WEIGHT RANGE ASCERTAINED FOR EACH BASIC MEMORY DEPTH VALUE IDENTIFIED FROM A MACHINE FAILURE HISTORY

FIELD OF INVENTION

The invention relates to machine failure prediction techniques, especially, a method and system for machine failure prediction involving long time gaps.

BACKGROUND

Predicting when a specific machine may fail, based on history of earlier failures, additional causal parameters like ambient temperature, humidity or performance counters, has many uses since it allows technicians to take preventive actions e.g. procuring spare parts or performing other activities like checking electrical connections or wear or tear condition, etc. Prediction typically reduces cost of maintenance and improves customer satisfaction. Prediction of failure is of huge importance when it relates to equipment used for basic services like telecommunication.

Machine failure problem can be formulated as a sequence modelling problem of Artificial Intelligence. For example, a sequence of time stamps where value at each time stamp is 0 if the machine has not failed, or 1 if the machine has failed. If other parameters like temperature, humidity, etc., are considered for each time stamp, in addition to 0 or 1, values of these parameters will also be included. The difficulty of machine failure prediction is to use this history information to generate assertions like "next failure will happen after 3 days" or "next failure will happen after 2 days and again failure will happen after a gap of another 5 days".

Traditionally, Hidden Markov Models (HMM) have been used for machine failure prediction. However, HMM cannot handle long time gaps between successive failures, typically in excess of 10 time stamps. Recently, Recurrent Neural Networks (RNN) have been used for sequence modelling tasks applied for language modelling or machine translation. However, RNNs also cannot predict a future machine failure if long time gaps are involved, typically more than 15 time stamps, mainly because of vanishing gradient problem.

SUMMARY OF INVENTION

Embodiments of the invention provide a machine failure prediction solution which can handle long time gaps between successive failures.

According to one aspect of the invention, a method for machine failure prediction is provided. The method comprises:

identifying, by a first processor in a first computer system, a plurality of basic memory depth values based on a machine failure history;

ascertaining, by the first processor, a basic weight range for each of the plurality of basic memory depth values according to a pre-stored table which is stored in a memory and includes a plurality of mappings wherein each mapping relates a basic memory depth value to a basic weight range, or according to a predetermined formula for calculating the basic weight range based on the corresponding basic memory depth value;

ascertaining, by the first processor, a composite initial weight range by calculating an average weight range of the ascertained basic weight range for each identified basic memory depth value;

generating, by the first processor, initial weights based on the composite initial weight range; and predicting, by the first processor, a future failure using a Back Propagation Through Time (BPTT) trained Recurrent Neural Network (RNN) based on the generated initial weights.

According to another aspect of the invention, a system for machine failure prediction is provided. The system comprises: a first processor and a memory communicably coupled thereto, wherein the first memory is configured to store data to be executed by the first processor, wherein the first processor is configured to identify a plurality of basic memory depth values based on a machine failure history;

ascertain a basic weight range for each of the plurality of basic memory depth values according to a pre-stored table which is stored in the memory and includes a plurality of mappings wherein each mapping relates a basic memory depth value to a basic weight range, or according to a predetermined formula for calculating the basic weight range based on the corresponding basic memory depth value;

ascertain a composite initial weight range by calculating an average weight range of the ascertained basic weight range for each identified basic memory depth value;

generate initial weights based on the composite initial weight range; and predict a future failure using a Back Propagation Through Time (BPTT) trained Recurrent Neural Network (RNN) based on the generated initial weights.

Embodiments of the invention use a Back Propagation Through Time (BPTT) trained Recurrent Neural Network (RNN) with a particular weight initialization scheme to solve a machine failure prediction problem involving long time gaps. The particular weight initialization scheme is used to ascertain initial weights assigned between input and hidden units of the RNN to predict a future machine failure. With the method provided in the embodiments of the invention, even large time gap machine failure prediction problems, e.g. more than 20 time stamps, can converge quickly, i.e. the large time gap machine failure prediction problems can be solved within an acceptable time period.

BRIEF DESCRIPTION OF THE DRAWINGS

The invention will be described in detail with reference to the accompanying drawings, in which.

DETAILED DESCRIPTION OF EMBODIMENTS OF THE INVENTION

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference numerals refer to same or similar functionalities or features throughout the several views.

Figure 1:
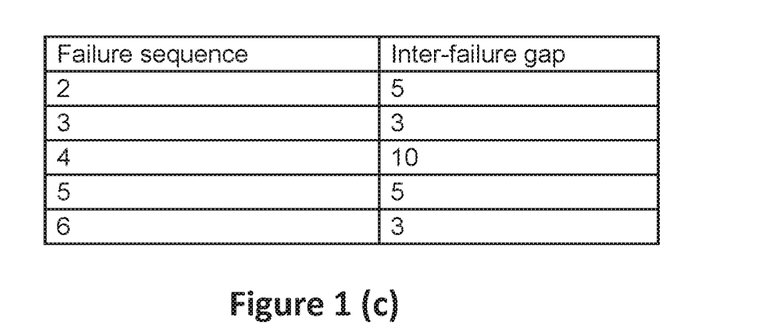
FIG. 1(a) shows a failure history according to a first example of the invention.
FIG. 1(b) shows a failure history according to a second example of the invention.
FIG. 1(c) is a table listing the inter-failure gaps in the failure history of the second example.
FIG. 1(d) shows the predicted future failure indicator sequence of the second example.
FIG. 1(e) is a table illustrating the extra parameters to be considered when predicting future machine failure.
FIG. 1(f) is a table listing the sample inputs for 7 time periods according to one example of the invention.
Figure 1A:
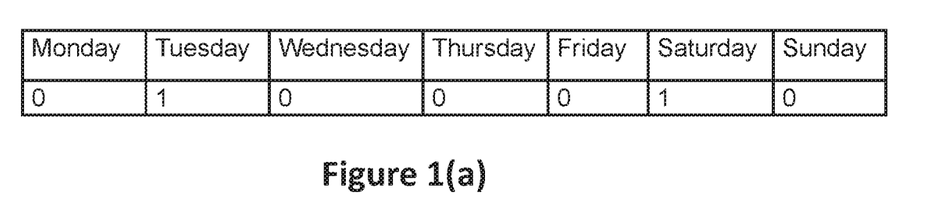

To explain how to formulate a machine failure as a sequence modelling problem, a failure history of a first example is shown in FIG. 1(a). In this example, the machine's failure is tracked over a week only. Each week starts at Monday and ends on Sunday. Machine has failed on Tuesday and again on Saturday. Thus, failure history can be expressed by binary string as shown in FIG. 1(a). Each occurrence of failure is denoted by '1', i.e. positive failure indicator, and non-occurrence by '0', i.e. negative failure indicator.

Figure 1B:
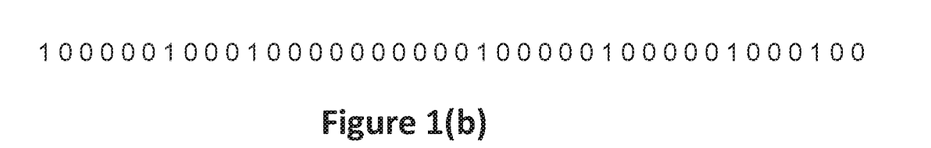

In a second example, its failure history is as shown in FIG. 1(b), According to the failure history, the $2^{nd}$ failure has happened at a gap of 5 days, $3^{rd}$ at a gap of 3 days, $4^{th}$ at a gap of 10 days. The inter-failure gaps in the failure history are listed in the table shown in FIG. 1(c). According to the pattern of the inter-failure gaps, it is predicted that next failure will happen at an inter-failure gap of 10 days. Since 2 days have already passed, so the failure could happen on 9th day from the current period. The predicted future failure indicator sequence is shown with bold font in FIG. 1(d).

Figure 1D:
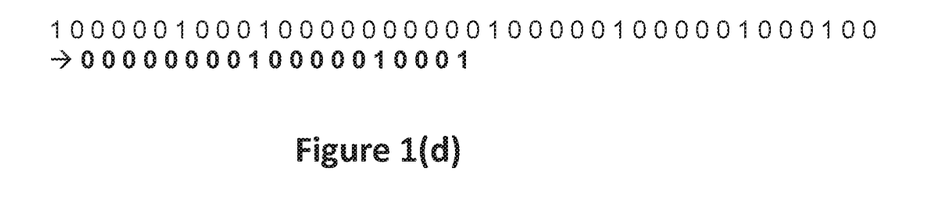
Figure 1E:
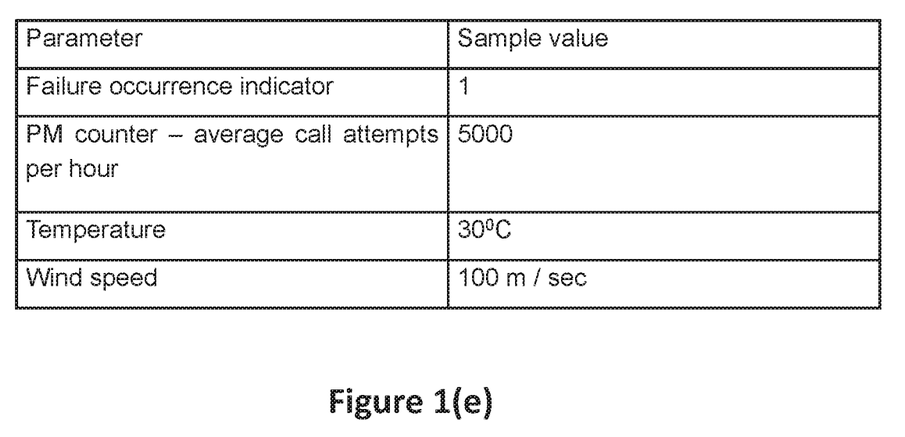
Figure 1F:
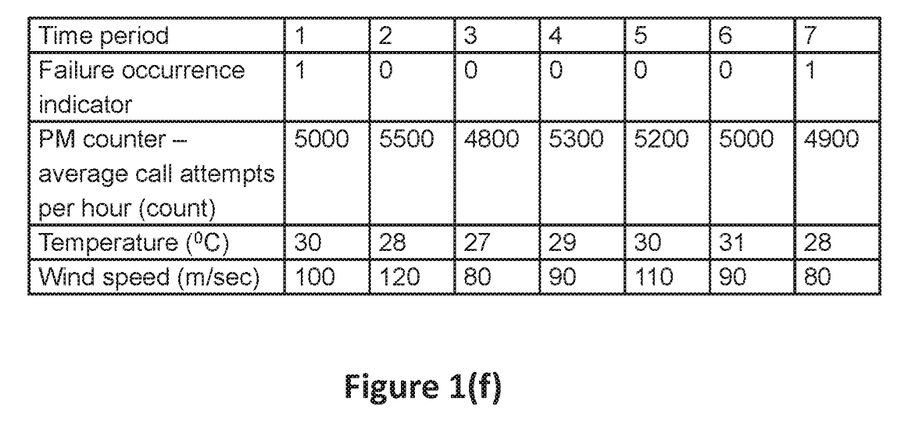

Though the failure history alone can be used for failure prediction, sometimes other data like specific performance parameter value, e.g. average call attempts per hour for telecom equipment or environmental parameters like temperature, wind speed etc., are also used to improve prediction accuracy. In those examples, for each time stamp, the input will be multiple quantities as shown in the table in FIG. 1(e). However, output will still be failure occurrence indicator for each of the future time periods. As the extra parameters shown in FIG. 1(e) are considered, the earlier pattern may not produce the output as shown in FIG. 1(d). FIG. 1(f) shows a table listing the sample inputs for 7 time periods to clarify the structure of the prediction problem.

The solution for predicting machine failures in this invention includes developing a model of inter-relationships among input vectors of successive time stamps to predict future failure occurrences so that an error measure, e.g. mean absolute deviation (hereinafter 'mad'), is minimized over given input instances. In other words, it means that when the model on 1st input is applied, the 2nd time stamp can be predicted. Similarly, when the model on 1st and 2nd input is applied, the 3rd time stamp can be predicted and so on. Since the failure indicators for 2nd or 3rd time stamps are known actually, the error in the following time stamp can be predicted and this also goes on for other time stamps. The invention tries to minimize cumulative measure of errors.

Figure 2:
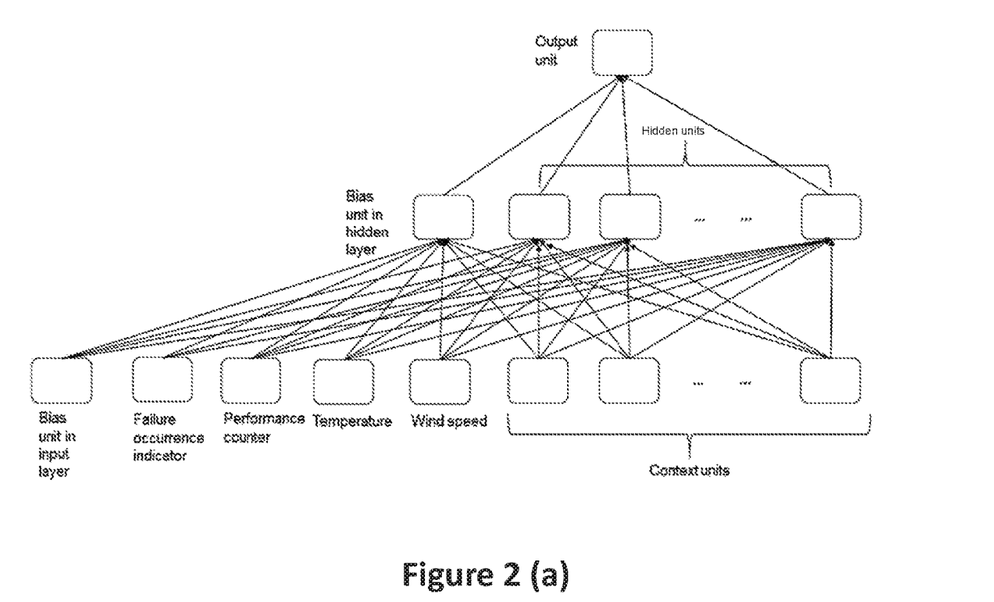
FIG. 2(a) shows architecture of a BPTT trained Recurrent Neural network (RNN) according to one example of the invention.
FIG. 2(b) shows a failure history of the third example.
FIG. 2(c) shows the generated future failure prediction sequence according to the third example.
FIG. 2(d) shows a failure history of a fourth example of the invention.

A RNN based prediction model is used for machine failure prediction in this invention. An example of the RNN architecture for machine failure prediction is shown in FIG. 2(a). Referring to FIG. 2(a), the RNN architecture is trained with Back Propagation Through Time (BPTT) and has multiple layers of neurons including input layer with a plurality of input units, hidden layer with a plurality of hidden units and an output layer with an output unit. In RNN, hidden units of time period (t−1), also called state units, are also used as input at time period (t). This simply means that the network at time period (t) is fed with the earlier state of the network at time period (t−1) to ensure that current prediction is influenced by earlier actual values.

It is explained below how the RNN can be used to predict machine failure based on a failure history sequence without other inputs like performance counter, temperature, wind speed etc. A failure history sequence of a third example of the invention is shown in FIG. 2(b). The RNN is configured with the following parameters:

Input units: 2 (including one bias unit (hereinafter "first input unit") and another bias unit for failure indicator (hereinafter "second input unit"))

Hidden units: 51 (including one bias unit and 50 context units)

Previous time steps considered for BPTT: 30

Initial weights for connections between input and hidden layer units including context unit connections as well as initial weights between hidden and output units: [−1.0, +1.0]

Activation function for hidden and output units: Sigmoid

Output unit of the RNN generates value between 0 and 1. For prediction, if the value is greater than or equal to 0.5, it is assumed that failure is predicted, else failure is not predicted.

If this network is trained with one failure indicator at a time, continuously trying to predict the next indicator and then continue with epoch after epoch, it has been found out that mean absolute deviation becomes less than 3% after 295 iterations. Mean absolute deviation per epoch is calculated by taking sum of all absolute deviations spanning all failure indicators and then dividing by count of failure indicators to be predicted. FIG. 2(c) shows the generated future failure prediction sequence according to the third example. According to the sequence shown in FIG. 2(c), the network has maintained inter-failure pattern i.e. consistent inter-failure gap of 2, 4 and 10. Please note that during prediction, if the predicted value is greater than or equal to 0.5, it is rounded up to 1 else down to 0. This is crucial for prediction of future characters.

FIG. 2(d) illustrates a failure history of a slightly complex problem of prediction which involves long temporal dependency according to a fourth example of the invention, using the network configuration described above. As shown in FIG. 2(d), the sequence of the failure history starts with a failure, then 2nd failure occurs after 20 time gaps, 3rd failure occurs after another 40 time gaps, 4th failure happens after another 20 time gaps. It is inferred that the next failure will happen after 40 time gaps. Please note that the examples use data with clear pattern, however the algorithm generalizes nicely i.e. even if the inter-failure gaps are not with perfect patterns, still prediction happens with accuracy what can be achieved by examining by human eye. This is the basis for cognitive computing.

When the network is run with the failure history shown in FIG. 2(d), it does not converge within 100,000 epochs. Test was abandoned after that because of time. The reason for this, traditionally thought, is RNN cannot remember inputs which were provided to it long time gap ago mainly because of vanishing gradient issue. In this case, RNN has to remember inputs provided 40 time steps ago.

In order to solve this issue, embodiments of the invention provide a solution for predicting machine failures, especially failure prediction problem having long temporal dependency, i.e. long time gaps. This solution uses a standard BPTT trained RNN with a particular weight initialization scheme to solve the failure prediction problem.

Figure 3:
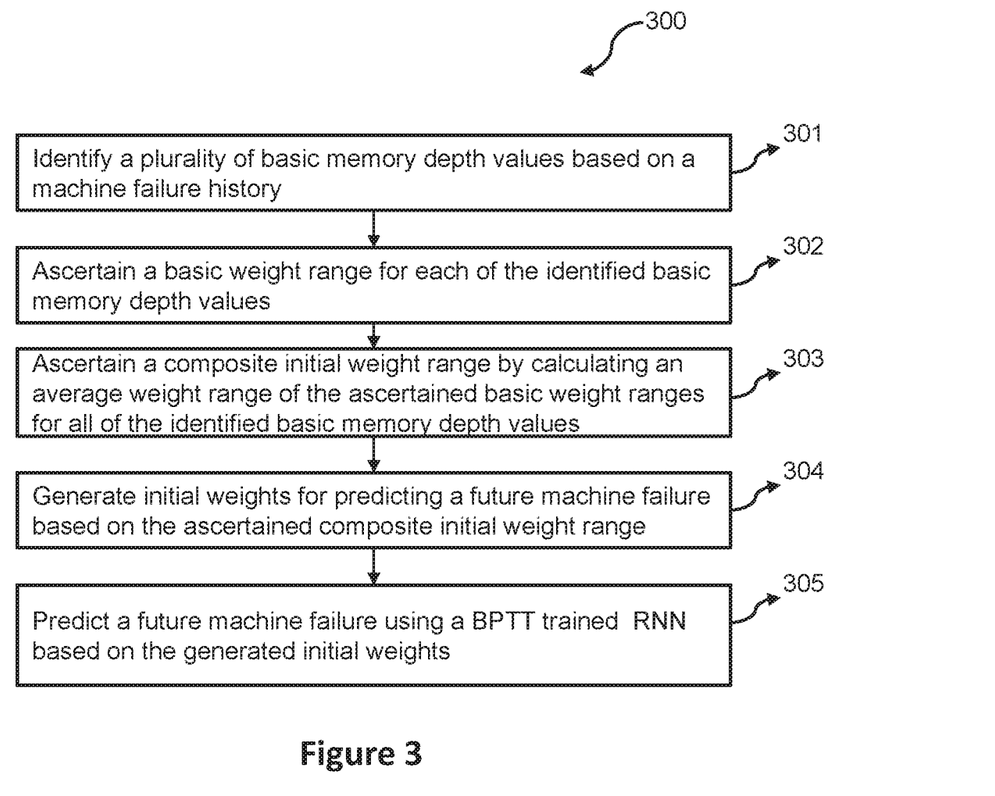
FIG. 3 is a flowchart illustrating a method for predicting a machine failure according to one embodiment of the invention.

FIG. 3 is a flowchart illustrating a method 300 for predicting a machine failure according to one embodiment of the invention.

In block 301, a processor in a computer identifies a plurality of basic memory depth values based on a machine failure history. In this embodiment, the machine failure history may be inputted by a user.

Figure 4:
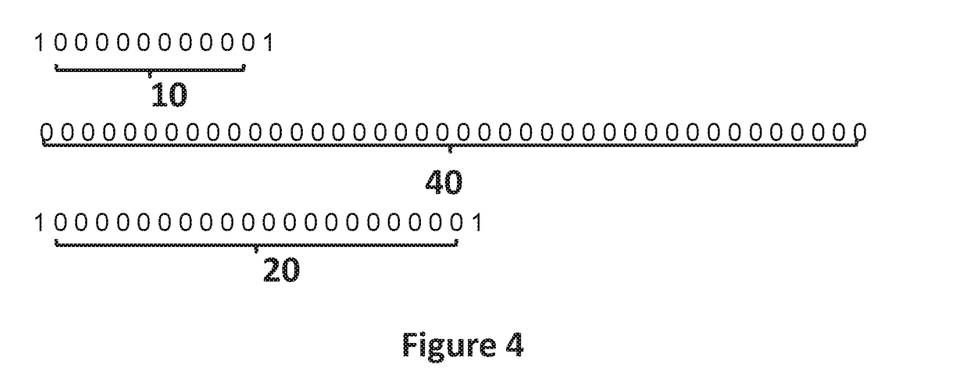
FIG. 4 shows a machine failure history sequence in one example of the embodiment of FIG. 3.

A sequence of the machine failure history in one example of this embodiment is shown in FIG. 4. In the sequence, 0 represents negative failure indicator, i.e. there is no machine failure; 1 represents positive failure indicator, i.e. there is a machine failure. A basic memory depth value refers to the number of zeroes between two successive positive failure indicators. As shown in FIG. 4, in this example, there are three basic memory depth values: 10, 40 and 20.

In block 302, the processor in the computer ascertains a basic weight range for each of the identified basic memory depth values.

Figure 5:
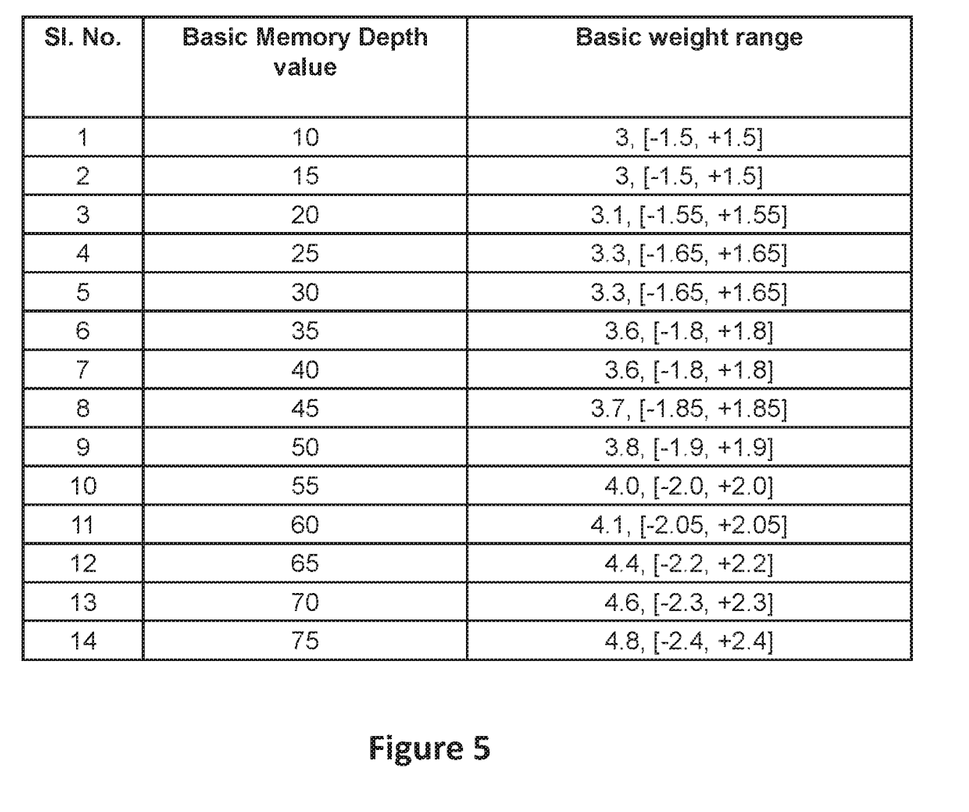
FIG. 5 shows one example of the pre-stored table in the embodiment of FIG. 3.

In one example, the basic weight range for each basic memory depth value is ascertained according to a pre-stored table which includes a plurality of mappings wherein each mapping relates a basic memory depth value to a basic weight range. The pre-stored table may be stored in a memory in the computer or stored in a flash memory which can be coupled to the computer and read by the processor. FIG. 5 shows one example of the pre-stored table. Referring to the pre-stored table in FIG. 5, the basic weight ranges for the three basic memory depth values: 10, 40 and 20, are respectively 3, 3.6 and 3.1. As shown in FIG. 5, the three basic weight ranges can also be represented as [−1.5, +1.5], [−1.55, +1.55], [−1.8, +1.8]. It should be noted that the pre-stored table used in other embodiments of the invention may be slightly different from the one shown in FIG. 5, i.e. the basic weight range for each basic memory depth value may be slightly different since different approaching method may be used.

Figure 9:
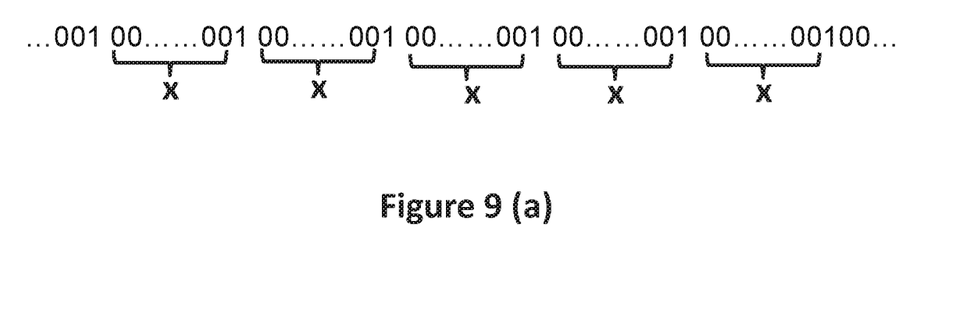
FIG. 9(a) shows a failure history sequence of an elementary failure prediction problem with a fixed memory depth x.
FIG. 9(b) is a flowchart illustrating a method for ascertaining the basic weight range for a basic memory depth value in the pre-stored table according to one embodiment of the invention.
FIG. 9(c) shows an architecture of a BPTT trained Recurrent Neural network (RNN) used in the method in FIG. 9(b)
FIG. 9(d) shows calculation results for each basic memory depth value according to the method in FIG. 9(b).

In order to generate each mapping between a basic memory depth value and a basic weight range in the pre-stored table, each basic memory depth value is considered to be an elementary failure prediction problem. An elementary prediction problem is defined to have a fixed memory depth value, i.e. the number of negative failure indicators 0 between any two successive positive failure indicators 1 in the corresponding failure history sequence is always the same. In other words, if the basic memory depth value is x, the failure history sequence of the corresponding elementary failure prediction problem is as shown in FIG. 9(a). The method for generating each mapping in the pre-stored table, i.e. method for ascertaining a basic weight range for each basic memory depth value, will be explained below with reference to FIG. 9(b).

Alternatively, in another example, the basic weight range for each basic memory depth value is ascertained according to a predetermined formula for calculating the basic weight range based on the corresponding basic memory depth value. One example of the predetermined formula is as follows:

$$\text{Basic Weight Range} = 0.0002 * x^2 + 0.0086 * x + 2.8797 \quad (1)$$

wherein x refers to the basic memory depth value.

Based on the formula (1) above, the basic weight ranges for the three basic memory depth values 10, 40 and 20 are respectively 2.9857, 3.5437 and 3.1317.

It should be noted that the parameters 0.0002, 0.0086 and 2.8797 in other embodiments may be slightly different since different approaching method may be adopted. Accordingly, the calculated basic weight ranges will be slightly different. However, convergence will still be achieved by weights calculated by this formula. A method for generating the predetermined formula will be explained in later paragraphs.

In block 303, the processor in the computer ascertains a composite initial weight range by calculating an average weight range of the ascertained basic weight ranges for all of the identified basic memory depth values.

For example, if the basic weight ranges for the three basic memory depth values: 10, 40 and 20 are respectively 3, 3.6, and 3.1, then the composite initial weight range is the average weight range, i.e. (3+3.6+3.1)/3=3.23.

In block 304, the processor in the computer generates initial weights for predicting a future machine failure based on the ascertained composite initial weight range.

In this embodiment, the initial weights may be calculated using nextDouble( ) method of Java™ based on the composite initial weight range. It should be noted that the generated initial weights are initial weights for connections between input and hidden layer units including context unit connections. Typically, the initial weights include a lower initial weight and an upper initial weight.

In addition, since weights between hidden and output units have been found having insignificant impact on machine failure prediction, a standard weight range of 1 or [−0.5, +0.5] is used in this embodiment. It is to be appreciated that different weight ranges between hidden and output units may be used in other embodiments.

In block 305, the processor in the computer predicts a future machine failure using a BPTT trained RNN based on the generated initial weights.

Figure 6:
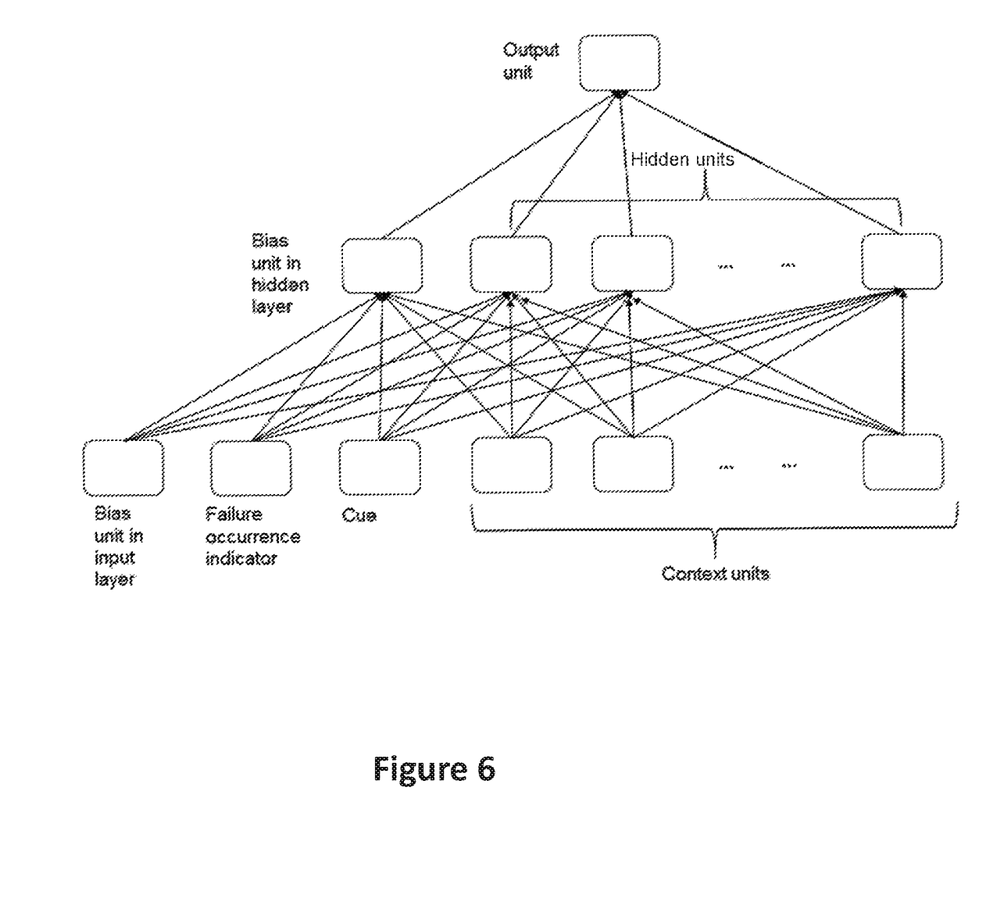
FIG. 6 shows architecture of a BPTT trained Recurrent Neural network (RNN) according to the embodiment in FIG. 3.

In one example, the RNN as shown in FIG. 6 is configured with the following parameters:

Input units: 3—Bias unit (hereinafter "first input unit"), Failure indicator (0 or 1) (hereinafter "second input unit") and cue unit (hereinafter "third input unit")

Hidden units: 51

Output units: 1

Number of previous time gaps for back propagation: 30

Initial weights for connections between input and hidden layer units, as well as initial weights between hidden and output units: [−0.5, +0.5]

Activation: Sigmoid for Hidden and Output units

Learning Rate: start with 0.2 and then scaled according to a predetermined scaling rule.

As for the third input unit, i.e. cue unit, it is used to provide an additional value for each failure indicator, i.e. a negative failure indicator 0 or positive failure indicator 1, in the machine failure history to allow the RNN to find a failure prediction pattern from the failure history sequence easily when the basic memory depth is not less than 40 and not greater than 70. The value of the cue unit for a failure indicator in the failure history sequence is ascertained based on the count of time stamps since last failure, i.e. the count of time stamps since a most recent previous positive failure indicator before the present failure indicator.

Figure 7:
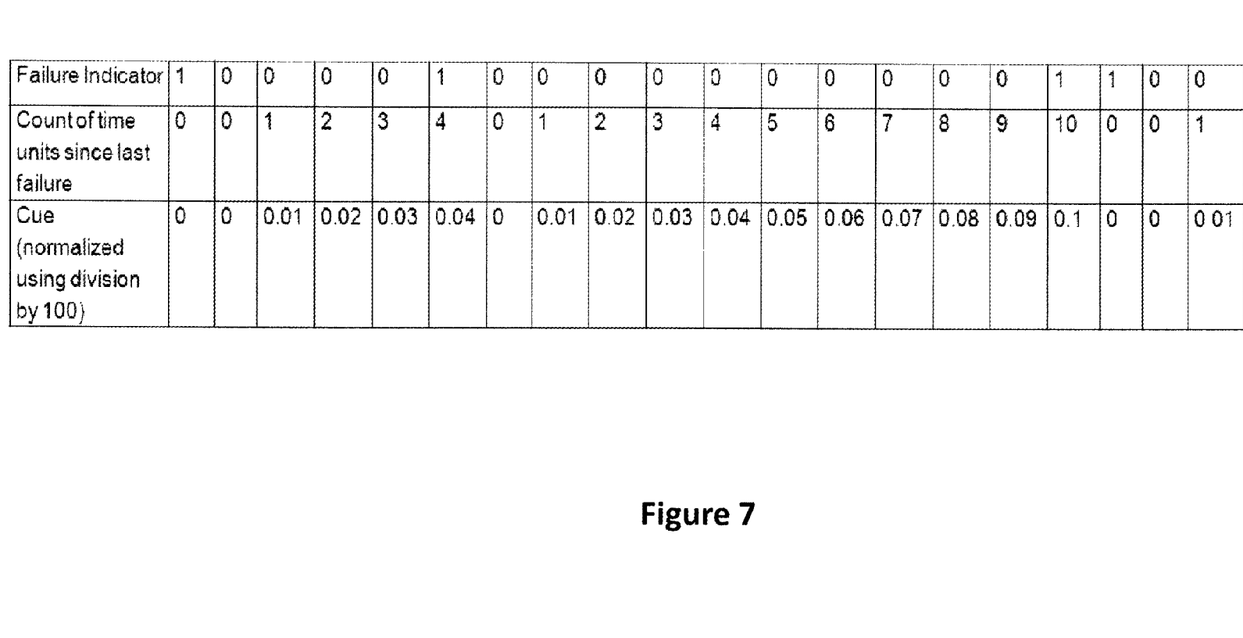
FIG. 7 is a table showing an example of the cue sequence for a machine failure history according to one embodiment of the invention.

FIG. 7 provides an example of the cue sequence for a machine failure history. The value of the cue unit for each failure indicator is shown in the table. In this example, the count starts from 0 and the value of the cue unit is ascertained based on the following Equation:

Value of cue unit for a failure indicator=(count of time stamps corresponding to the failure indicator since a most recent previous positive failure indicator before the failure indicator)/100

It should be noted that in other embodiments of the invention, the value of cue unit for each failure indicator may be ascertained based on other methods. For example, the value of cue unit may also be defined as other predefined function of count of time stamps.

As for the predetermined scaling rule for learning rate (eta), in one example, the following scaling rule is used:

starting value of learning rate (eta)=0.2, if 'mad' error, measured as "mean absolute deviation" for each epoch, goes below 0.04, scaling the learning rate to eta I=eta/6; then if 'mad' error goes below 0.03, scaling the learning rate further to eta II=eta U/2;

if 'mad' error goes below 0.025, scaling the learning rate further to eta III=eta II/2;

if 'mad' error goes below 0.02, scaling the learning rate further to eta IV=eta III/2.

Figure 8:
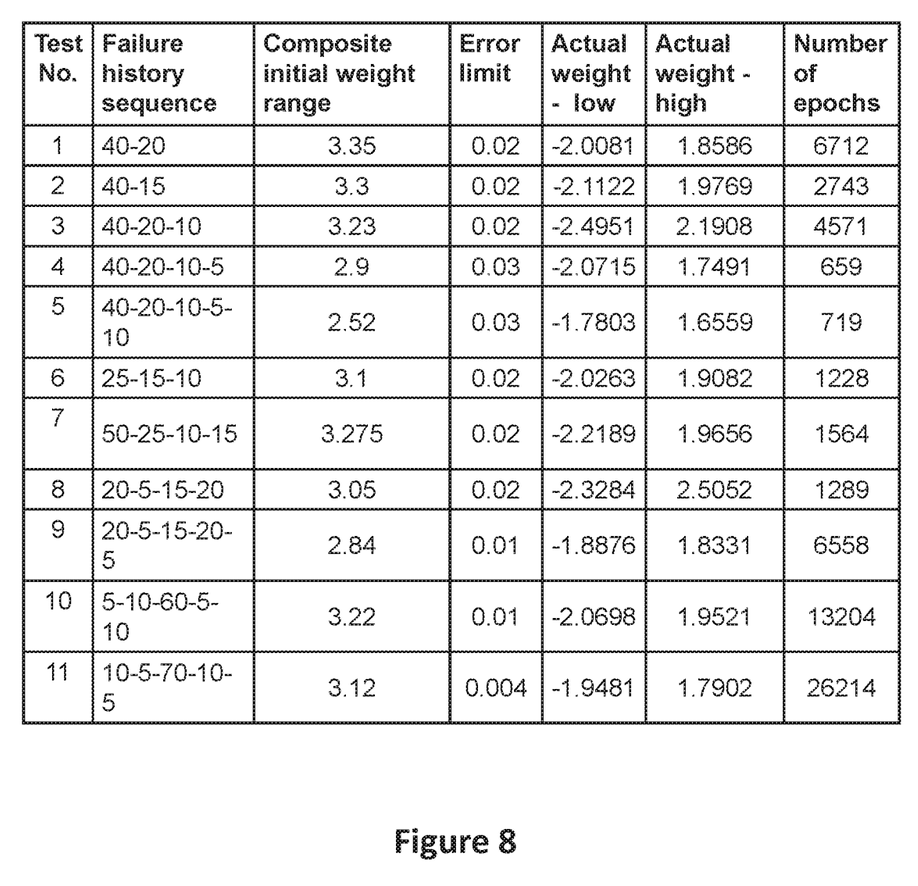
FIG. 8 is a table showing the testing results for composite failure history sequences with composite initial weight range according to embodiments of the invention.

FIG. 8 is a table showing the test results for composite failure history sequences with composite initial weight range. The composite initial weight range for each test in the table is ascertained based on the basic memory depth values in the test and the corresponding basic weight ranges ascertained according to the pre-stored table in FIG. 3 or the predetermined generic formula. The testing result for the $11^{th}$ test shows that the method disclosed in this embodiment of the invention can properly and correctly solve a machine failure prediction problem with 70 time gaps. Also, the results for the $1^{st}$ to $8^{th}$ tests in the table prove that the machine failure prediction problem can be solved even if there is no clear visible pattern in the failure history sequence using the method provided in the invention.

FIG. 9(b) is a flowchart illustrating a method for ascertaining the basic weight range for a basic memory depth value in the pre-stored table according to one embodiment of the invention.

In block 901, a processor in a computer configures a Recurrent Neural Network (RNN) with a set of predetermined parameters based on the basic memory depth value.

Figure 9C:
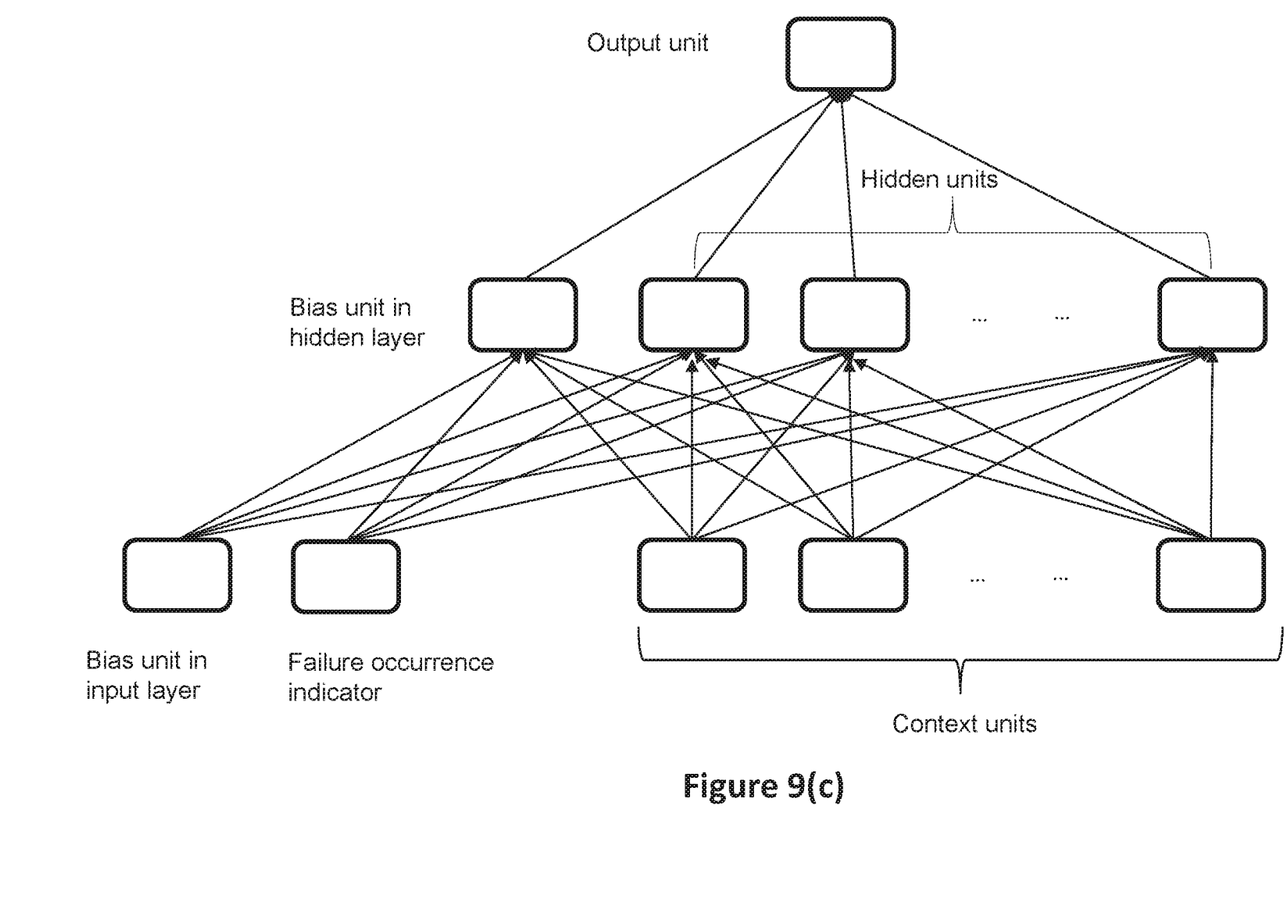

Specifically, if the basic memory depth value is less than 40, referring to FIG. 9(c), the RNN is configured with the following parameters:

Input units: 2 (one bias unit (hereinafter "first unit") and another bias unit for failure indicator (hereinafter "second unit"))

Hidden units: 51 (one bias unit and 50 context units)

Output units: 1

Number of previous time gaps for back propagation: 30

Activation: Sigmoid for hidden and output units

Learning Rate: start with 0.2 and then scaled according to the predetermined scaling rules as described above.

If the basic memory depth value is greater than or equal to 40 and not greater than 70, the RNN is configured with the parameters above, and further configured with a third input unit, i.e. cue unit. The architecture of the RNN is same as that shown in FIG. 6. A cue value for each failure indicator may be determined based on the count of time units since the most recent previous failure before the failure indicator, as mentioned above.

In block 902, the processor in the computer selects an initial memory depth value and an initial weight range for predicting a future machine failure based on the basic memory depth value.

Preferably, if the basic memory depth value is less than 40, the processor selects 10 as the initial memory depth value and selects [−0.5, +0.5] as the initial weight range; if the basic memory depth value is no less than 40 and not greater than 70, the processor selects 40 as the initial memory depth value and selects [−1.8, +1.8] as the initial weight range.

In block 903, the processor in the computer ascertains the basic weight range for the basic memory depth value by starting from the initial weight range and gradually increasing the initial weight range until a minimum number of epochs for convergence is obtained.

Figure 9D:
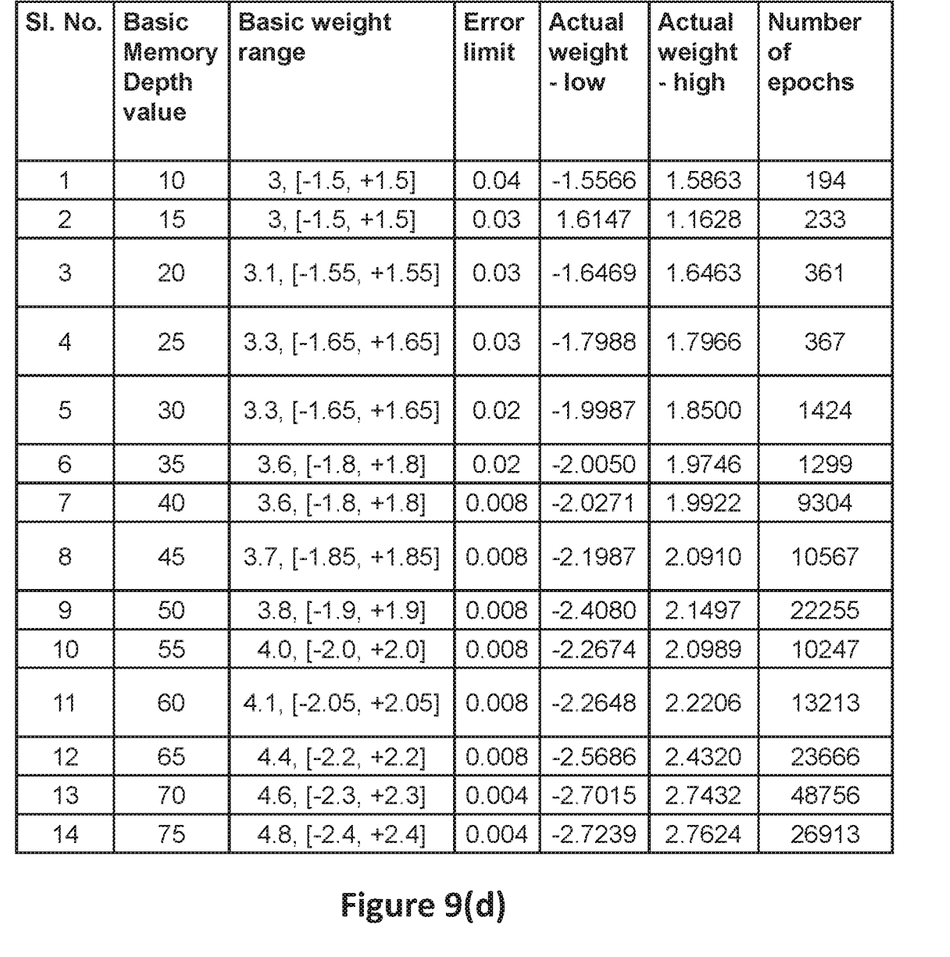

Accordingly, the pre-stored table can be generated based on the method above by ascertaining a basic weight range for each basic memory depth value in the pre-stored table. FIG. 9(d) shows the calculation results for each basic memory depth value. Besides the ascertained basic weight range, the error limit, actual weight-low and actual weight-high, and the minimum number of epochs for convergence are also provided. Thus, in the process for predicting a future machine failure as shown in FIG. 3, the basic weight range for a basic memory depth value can be ascertained according to the corresponding mapping stored in the pre-stored table.

Alternatively, a generic formula may be generated based on at least one basic memory depth value and the corresponding basic weight range ascertained according to the method shown in FIG. 8, and then in the process for predicting a future machine failure as shown in FIG. 3, the basic weight range for a basic memory depth value can be ascertained based on the generated generic formula.

It should be noted that the pre-stored table or the predetermined formula may be generated by the same processor in the same computer which is used for predicting the future machine failure using the method shown in FIG. 1, or generated by a different processor in a different computer.

As service providers typically use trouble ticket (TT) systems for fault tracking and closure to obtain historical fault information of a machine, in some embodiments of the invention, the binary code based failure history can be generated based on the historical fault information obtained by TT systems. In order to make sure the machine failure prediction usable, an equipment, root cause and sub-root cause need to be provided with each TT system. With the information generated by TT systems, a binary code based failure sequence can be generated for each combination of equipment, root cause and sub-root cause. The time stamp/time period for generating the failure history can be decided based on fault frequency and typically vary between 1 day to one week. A probability value may be also provided with each failure prediction. In embodiments of this invention, probability is taken as the value of the output unit. The output unit value always lies between 0 and 1 since Sigmoid activation function is used.

As will be appreciated from the above, embodiments of the invention provide a method for predicting machine failures. This method uses a standard RNN trained with BPTT and a particular scheme for ascertaining initial weights to be used for predicting machine failures. It has been tested that the method disclosed in the embodiments of the invention can solve a machine failure prediction problem involving long time gaps up to 60 time gaps without resorting to a more complex architecture, e.g. the existing Long Short-Term Memory (LSTM). Any complex failure prediction problem can be resolved in fairly small amount of search with the initial weights ascertained based on the particular scheme proposed in the invention. In the testing with problems of time gaps up to 60, the maximum number of iterations is less than 25000. Assuming each time stamp represents a 2-day time slot, 60 time gaps mean that the method can be used to predict machine failure 120 days in advance. Therefore, with the method and system provided by embodiments of the invention, both time costs and other related facility costs will be greatly reduced.

With the machine failure prediction method, future machine failures can be accurately predicted in advance so that operations can have enough time to plan actions to avert failures. The planned actions vary based on fault types but typically involve planning maintenance, arranging for spare parts, checking electrical connections, and checking acid strength for battery failure, etc.

In addition to increasing up-time of a machine, guaranteeing Service Level Agreement (SLA) compliance, providing better customer service and saving lives in case of life-saving equipments, machine failure prediction can directly save operation cost. For example, in some cases, if a failure happens, a technician may have to travel to remote site. However, based on failure prediction, if actions are initiated, travel can sometimes be eliminated and travel cost can be saved; in some countries, for basic services like telecommunication, customers are to be compensated, as per government regulation, if a call gets dropped. If actions are taken based on failure prediction, compensation amount could be reduced.

It is to be appreciated by a skilled person that the same method works for not only long time gap prediction problems also short time gap prediction problems.

It is to be understood that the embodiments and features described above should be considered exemplary and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method for machine failure prediction, the method comprising:
   identifying, by a first processor in a first computer system, a plurality of basic memory depth values based on a machine failure history;
   ascertaining, by the first processor, a basic weight range corresponding to each of the plurality of basic memory depth values according to a pre-stored table which is stored in a memory and includes a plurality of mappings wherein each mapping relates one of the plurality of basic memory depth values to a corresponding basic weight range, or according to a predetermined formula for calculating the basic weight range based on the corresponding basic memory depth value;
   ascertaining, by the first processor, a composite initial weight range by calculating an average weight range of the ascertained basic weight range for each identified basic memory depth value;
   generating, by the first processor, initial weights based on the composite initial weight range; and
   predicting, by the first processor, a future failure using a Back Propagation Through Time (BPTT) trained first Recurrent Neural Network (RNN) based on the generated initial weights.

2. The method according to claim 1, wherein each mapping between the one of the plurality of basic memory depth values and the corresponding basic weight range in the pre-stored table is ascertained according to the following steps:
   configuring, by a second processor in a second computer, a second Recurrent Neural Network (RNN) with a set of predetermined parameters;
   selecting, by the second processor, an initial memory depth value and an initial weight range based on the one of the plurality of basic memory depth values, and
   ascertaining, by the second processor, the corresponding basic weight range by starting with the selected initial weight range and gradually increasing the initial weight range until a minimum number of epochs for convergence is obtained.

3. The method according to claim 2, wherein the selecting the initial memory depth value and the initial weight range based on the one of the plurality of basic memory depth values further comprises:
   if the one of the plurality of basic memory depth values is less than 40, selecting 10 as the initial memory depth value and selecting [−0.5, +0.5] as the initial weight range; and
   if the one of the plurality of basic memory depth values is no less than 40 and not greater than 70, selecting 40 as the initial memory depth value and selecting [−1.8, +1.8] as the initial weight range.

4. The method according to claim 2, wherein configuring the second RNN with the set of predetermined parameters comprises:
   configuring the second RNN with parameters as follows:
   Input units: 2 being a first input unit and a second input unit;
   Hidden units: 51;
   Output units: 1;
   Number of previous time gaps for back propagation: 30;
   Activation: Sigmoid for Hidden and Output units; and
   Learning Rate: start with 0.2 which is subsequently scaled according to a predetermined scaling rule.

5. The method according to claim 4, wherein the configuring, by the second processor in the second computer, the second RNN with the set of predetermined parameters further comprises:
if the one of the plurality of basic memory depth values is not less than 40 and not greater than 70, configuring the second RNN with a third input unit, wherein a value of the third input unit corresponding to a failure indicator in the machine failure history sequence is ascertained based on a count of time stamps since a most recent previous positive failure indicator before the failure indicator.

6. The method according to claim 5, wherein the count of time stamps starts from 0 and the value of the third input unit corresponding to the failure indicator is ascertained by dividing the count of time stamps since the most recent positive failure indicator before the failure indicator by 100.

7. The method according to claim 4, wherein the predetermined scaling rule includes:
starting value of learning rate eta=0.2, then
if 'mad' error, measured as "mean absolute deviation" for each epoch, goes below 0.04, scaling the learning rate to eta I=eta/6; then
if 'mad' error goes below 0.03, scaling the learning rate further to eta II=eta I/2;
if 'mad' error goes below 0.025, scaling the learning rate further to eta III=eta and II/2;
if 'mad' error goes below 0.02, scaling the learning rate further to eta IV=eta III /2.

8. The method according to claim 2, wherein the first processor and the second processor are provided as the same processor.

9. The method according to claim 1, wherein the predetermined formula for calculating the basic weight range based on the corresponding basic memory depth value is as follows:

$$\text{Basic Weight Range}=0.0002*x^2+0.0086*x+2.8797 \quad (1)$$

wherein x refers to the corresponding basic memory depth value.

10. A non-transitory computer readable medium comprising computer program code for machine failure prediction, wherein the computer program code, when executed, is configured to cause a processor in a computer system perform the method according to claim 1.

11. A system for machine failure prediction, the system comprising: a first processor and a memory communicably coupled thereto,
wherein the first memory is configured to store data to be executed by the first processor,
wherein the first processor is configured to
identify a plurality of basic memory depth values based on a machine failure history;
ascertain a basic weight range corresponding to each of the plurality of basic memory depth values according to a pre-stored table which is stored in the memory and includes a plurality of mappings wherein each mapping relates one of the plurality of basic memory depth values to a corresponding basic weight range, or according to a predetermined formula for calculating the basic weight range based on the corresponding basic memory depth value;
ascertain a composite initial weight range by calculating an average weight range of the ascertained basic weight range for each identified basic memory depth value;
generate initial weights based on the composite initial weight range; and
predict a future failure using a Back Propagation Through Time (BPTT) trained first Recurrent Neural Network (RNN) based on the generated initial weights.

12. The system according to claim 11, further comprising:
a second processor, wherein in order to generate each mapping between the one of the plurality of basic memory depth values and the corresponding basic weight range in the pre-stored table in the memory, the second processor is configured to
configure a second Recurrent Neural Network (RNN) with a set of predetermined parameters;
select an initial memory depth value and an initial weight range based on one of the plurality of the basic memory depth values, and
ascertain the corresponding basic weight range by starting with the selected initial weight range and gradually increasing the initial weight range until a minimum number of epochs for convergence is obtained.

13. The system according to claim 12, wherein the second processor is further configured to
if the one of the plurality of basic memory depth values is less than 40, select 10 as the initial memory depth value and select [−0.5, +0.5] as the initial weight range; and
if the one of the plurality of basic memory depth values is no less than 40 and not greater than 70, select 40 as the initial memory depth value and select [−1.8, +1.8] as the initial weight range.

14. The system according to claim 12, wherein the set of predetermined parameters comprises:
Input units: 2 being a first input unit and a second input unit;
Hidden units: 51;
Output units: 1;
Number of previous time gaps for back propagation: 30;
Activation: Sigmoid for Hidden and Output units; and
Learning Rate: start with 0.2 which is subsequently scaled according to a predetermined scaling rule.

15. The system according to claim 14, wherein the set of predetermined parameters further comprises a third input unit if the one of the plurality of basic memory depth values is not less than 40 and not greater than 70,
wherein the second processor is further configured to ascertain a value of the third input unit corresponding to a failure indicator in the machine failure history sequence based on a count of time stamps since a most recent previous positive failure indicator before the failure indicator.

16. The system according to claim 15, wherein the second processor is configured to
ascertain the value of the third input unit corresponding to the failure indicator by dividing the count of time stamps since the most recent positive failure indicator before the failure indicator by 100,
wherein the count of time stamps between two successive positive failure indicators starts from 0.

17. The system according to claim 14, wherein the predetermined scaling rule includes:
starting value of learning rate eta=0.2, then
if 'mad' error, measured as mean absolute deviation for each epoch, goes below 0.04, scaling the learning rate to eta I=eta/6; then
if 'mad' error goes below 0.03, scaling the learning rate further to eta II=eta I/2;
if 'mad' error goes below 0.025, scaling the learning rate further to eta III=eta II/2;

if 'mad' error goes below 0.02, scaling the learning rate further to eta IV=eta III /2.

18. The system according to claim 12, wherein the first processor and the second processor are provided as the same processor.

19. The system according to claim 11, wherein the predetermined formula for calculating the basic weight range based on the corresponding basic memory depth value is as follows:

$$\text{Basic Weight Range} = 0.0002 * x^2 + 0.0086 * x + 2.8797 \quad (1)$$

wherein x refers to the corresponding basic memory depth value.

\* \* \* \* \*